(No Model.)

T. FANE & C. F. LAVENDER.
TIRE FOR CYCLES.

No. 484,786. Patented Oct. 25, 1892.

Witnesses,
Harry Nixon.
C. P. Lawrie.

Inventors,
Thomas Fane & C. F. Lavender
by Charles H. Rickes
Their attorney.

UNITED STATES PATENT OFFICE.

THOMAS FANE AND CHARLES F. LAVENDER, OF TORONTO, CANADA.

TIRE FOR CYCLES.

SPECIFICATION forming part of Letters Patent No. 484,786, dated October 25, 1892.

Application filed November 18, 1891. Serial No. 412,330. (No model.)

*To all whom it may concern:*

Be it known that we, THOMAS FANE and CHARLES F. LAVENDER, manufacturers, both of the city of Toronto, in the county of York, Province of Ontario, Canada, have invented certain new and useful Improvements in Tires for Cycles; and we hereby declare that the following is a full, clear, and exact description of the same.

Heretofore pneumatic tires for cycles consisted principally of two styles, which are known, respectively, as the "Dunlop" and the "Clinchers." The former of these was comprised of an air-tube covered with a thin sheet of canvas and inclosed in an outer tube, commonly called the "tire," bound to the rim of the wheel by a thin covering of canvas, which covering completely inclosed both the tire and the rim of the wheel. In the event of this tire becoming punctured it was necessary to remove the entire outer covering of canvas, the outer covering of rubber, and also that portion of the canvas covering of the air-tube surrounding the punctured part to allow of the patch being put on to close the puncture. When the puncture was properly patched, it was necessary to inclose the air-tube in the outer covering of rubber, place the tire in position on the rim, and again bind on the canvas covering. Besides the large loss of valuable time during the operation of repairing, (which could only be accomplished by skilled mechanics provided with a complete outfit of repairing-tools,) the surface of the tire was rendered uneven by this manner of patching. The Clincher tire consisted of a rim especially formed for this purpose, an air-tube placed on the periphery of this rim, and an outer covering of rubber inclosing the air-tube, the ends of which outer covering were held by the clinched portion of said rim, the great objection to this tire being that it was necessary to make the sides of the rim of the wheel of such a size as to render the tire of little more advantage than what is ordinarily known as the "cushion-tire;" and the object of our invention is to produce a pneumatic tire which can be easily removed, repaired, and replaced, while at the same time it retains the elasticity obtained from the expansion of the air-tube by the pressure of the air contained therein; and it consists, essentially, of the device hereinafter more fully set forth, and more particularly pointed out in the claim.

Figure 1:
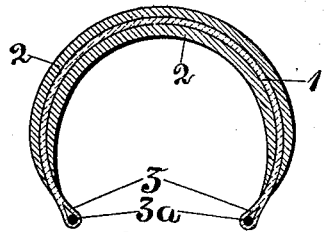
Figure 2:
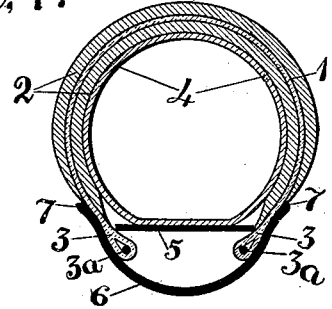
Figure 3:
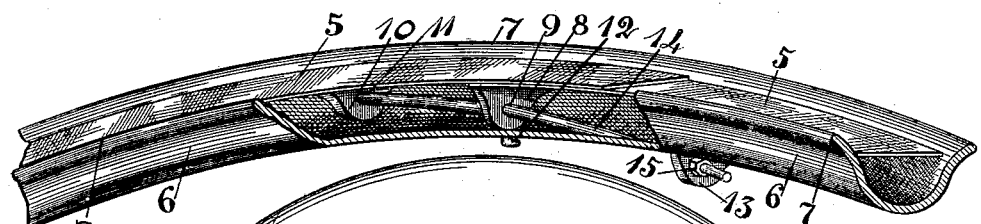
Figure 4:

In the drawings, Figure 1 is a cross-sectional view of the outer covering. Fig. 2 is a cross-sectional view of a pneumatic tire and rim of a wheel, showing means for securing the tire to the rim, which consists of an annular plate placed therein. Fig. 3 is a perspective view, partially in section, of a section of the rim of a wheel, showing in perspective the same annular plate for securing the tire to the rim as that illustrated in Fig. 2, and also showing the means for connecting the ends of said annular plate. Fig. 4 is a cross-sectional perspective view of one half of a wheel, showing the rim and the tire disinflated ready for removal.

Like numerals of reference refer to like parts throughout the specification and drawings.

As shown in the drawings, the outer tube, commonly called the "tire," consists of a strip of fabric material 1, with a sheet of rubber 2 placed on either side of it. It will be noticed by reference to the drawings that the strip of fabric material 1 projects beyond the edges of the rubber 2 and has formed along each edge a loop 3, through which passes an endless wire or ring $3^a$. The inner tire consists of an air-tube 4, provided with the usual means of inflation and inclosed by the outer covering or tire and the rim 6 of the wheel.

By reference to Fig. 1 of the drawings it will be noticed that our outer covering or tire is arched shape or curved in cross-section, and the object of this construction is to render the tire proof against being readily punctured. In the tires hereinbefore described the outer covering was made flat in cross-section, and to place the tire in position on the wheel it was necessary to stretch it to a considerable extent, which stretching rendered the tire weakest at the point where the greatest resistance and strength were required and rendered strongest at that point at which no great strength or resisting power was required.

From the construction of our outer covering or tire it will be seen that the tire is made in the first place in the form it is required to be when placed in position on the wheel and the air-tube inflated to its fullest extent, and that there is no stretching or expansion required to place it and hold it in position on the rim of the wheel.

In Fig. 2 we have shown the means for holding the pneumatic tire in place. It will be noticed that the air-tube rests upon an annular plate 5, located in the rim 6 of the wheel, and also that said air-tube is partially surrounded by the outer covering of tire.

Again, by reference to the drawings it will be noticed that the wired edge 3 extends beneath the annular plate 5 and that the edges 7 of the rim 6 project above said plate 5. By inflating the air-tube 4 to its fullest capacity the annular plate 5 is forced upon the outer covering or tire and firmly holds the same in position, the wired edge preventing the ends of the outer covering passing from beneath the edge of the annular plate 5 and rim 6, and it might here be stated that the greater the pressure upon the plate 5 the more firmly the tires are held in position.

In Fig. 3 we have shown our method of joining the ends of the annular plate 5, which consists of casting a lug 8 upon the under side of the plate 5 at one end and forming an opening 9 therethrough and casting a second lug 10 on the under side of said annular plate 5 at or near the opposite end and forming an aperture 11 therethrough.

It will be noticed again by reference to the drawings that the lug 8 is fitted with a teat 12, which projects through an opening formed in the under side of the rim 6 for the purpose of firmly holding said lug in position. On the under side of the rim 6 and on the side of the lug 8 opposite to the lug 10 is a lug 13, fitted with an aperture through which passes the bolt 14, fitted with a tightening-nut 15, said bolt 14 having an enlarged head, which butts against the face of the lug 10. By screwing the nut 15 on the bolt 10 the ends of the annular plate 5 are quickly and securely brought into their proper position.

Having thus fully described our invention, what we claim as new, and desire to secure by Letters Patent, is—

A tire for a wheel, consisting of an air-tube provided with the usual means of inflation, an outer tube or covering having each edge enlarged or beaded, in combination with the rim of the wheel and an annular plate located therein to grip the beaded or enlarged edges of the outer tube or covering and securely hold all parts in place, a lug cast on the under side of each end of said annular plate, and a lug secured to the under side of the rim of the wheel, a tightening-bolt passing through all of said lugs, having its inner end riveted or enlarged to prevent it passing through said lugs, and a tightening-nut on its outer end for the purpose of drawing the ends of said annular plate tightly together, substantially as described.

Toronto, November 3, 1891.

THOMAS FANE.
  CHARLES F. LAVENDER.

Witnesses:
 CHAS. H. RICHES,
 M. E. ANGELL.